United States Patent [19]
Brown et al.

[11] Patent Number: 5,273,695
[45] Date of Patent: Dec. 28, 1993

[54] PROCESS FOR PREPARING MULTIHARDNESS FOAM ARTICLES

[75] Inventors: Michael J. Brown, Grand-Lancy, Switzerland; Werner A. Lidy, Terneuzen, Netherlands

[73] Assignee: The Dow Chemical Company, Midland, Mich.

[21] Appl. No.: 776,382

[22] PCT Filed: May 9, 1990

[86] PCT No.: PCT/GB90/00719

§ 371 Date: Nov. 18, 1991

§ 102(e) Date: Nov. 18, 1991

[87] PCT Pub. No.: WO90/14215

PCT Pub. Date: Nov. 29, 1990

[30] Foreign Application Priority Data

May 18, 1989 [GB] United Kingdom ............... 8911457

[51] Int. Cl.$^5$ ........................................... B29C 67/22
[52] U.S. Cl. .................... 264/45.1; 264/46.4; 264/46.6
[58] Field of Search ............. 264/45.1, 46.4, 46.6, 264/46.8

[56] References Cited

U.S. PATENT DOCUMENTS

| | | | |
|---|---|---|---|
| 4,714,574 | 12/1987 | Tenhagen | 264/45.1 |
| 4,726,086 | 2/1988 | McEvoy | 264/45.1 |
| 4,762,654 | 8/1988 | Fuchigami et al. | 264/45.1 |
| 4,804,506 | 2/1989 | Okamoto et al. | 264/45.1 |
| 4,975,229 | 12/1990 | Kita et al. | 264/45.2 |

FOREIGN PATENT DOCUMENTS

| | | | |
|---|---|---|---|
| 61-290013 | 12/1986 | Japan | 264/45.1 |
| 62-066911 | 3/1987 | Japan | 264/45.1 |

*Primary Examiner*—Allan R. Kuhns

[57] ABSTRACT

A multihardness foamed seat having side rolls including one or more zones of a second polyurethane foam encapsulated in a first polyurethane foam is prepared by arranging the seat mould (10) so that the side roll well (12) is inclined in a direction parallel to its length, introducing a liquid first foam formulation into the side roll well, and then introducing a liquid second foam formulation within a time interval corresponding to between 0.01t to 1.5t where t is the cream time of the first foam formulation. The process is particularly useful for the preparation of automobile seats having side rolls.

10 Claims, 1 Drawing Sheet

SUBSTITUTE SHEET

PROCESS FOR PREPARING MULTIHARDNESS FOAM ARTICLES

The present invention relates to the preparation of multihardness polyurethane foam articles by the pouring of differing foam formulations into a mould. In particular the present invention relates to a process for preparing side rolls for seats which comprise a hard polyurethane foam encapsulated within a soft polyurethane foam.

The preparation of multihardness foams comprising inter alia zones of hard foam encapsulated within a soft foam is described in European Patent No. 68820. This patent describes the process of such materials by first introducing a soft foam formulation into a mould and thereafter adding a hard foam formulation into the foaming soft formulation. The hard foam formulation is thus added after the soft foam formulation has had an opportunity to expand.

A problem arises with the technology described in this patent during the manufacture of side rolls for automobile seating. In the side rolls wells of automobile seating moulds there is a tendency for the liquid hard foam formulation to penetrate completely the expanding soft foam formulation particularly at the point of pouring thereby giving rise to areas in the cured foam articles where the hard foam is not encapsulated in the soft. One approach to solving this problem is to partially froth the hard foam formulation as described in European Patent No. 251803.

Another approach to manufacturing multilayer or multihardness seats is described in European Patent No. 251659. This patent describes a process which involves pouring sequentially two or more foam formulations, designed to produce two or more foams of differing hardness, onto a given point in the bottom half of a seat mould and thereafter allowing them to rise and cure. The seat mould is inclined slightly to the horizontal (preferably 5–12 degrees) and the point of pouring is located at or near the top of the inclined bottom surface of the mould. It is a feature of the process described that the formulations are poured sequentially without any waiting time between, hence no foaming of any of the formulations takes place on the time scale on which pouring occurs. Although, according to the patentee, it would be expected that under such conditions, the formulations would mix, this does not however occur and, after curing, a foam seat comprising discrete layers of the various foams is produced. The discrete layers are found to be bonded to one another. It is to be noted that this patent does not disclose what happens when this technology is applied to the side roll wells of automobile seating moulds. From the teaching of the European Patent No. 251659 it would be expected, that two foam layers, e.g. a hard and a soft one, would always be formed, and that there would be no difference between the centre part of the mould and the side roll wells. In addition the patent only describes explicitly the preparation of layered foam cushions with discrete hard side rolls.

It has now been found that by inclining the bottom surface of the mould, such that the bottom of the side rolls well is inclined and by adding the second foam formulation to the first within a specified time after the first has been added then the problem of hard foam penetration can be overcome or at least minimised. It has also has been found that by using the process of the present invention degree of encapsulation of the second foam in the first foam can be controlled.

According to the present invention there is therefore provided a process for preparing a multihardness or multidensity foamed seat, particularly an automobile seat, having side rolls comprising one or more zones of a second polyurethane foam encapsulated in a first polyurethane foam by foaming and curing a first polyurethane foam formulation and a second polyurethane foam formulation in a side roll well of seat mould which comprises the steps of:

(a) arranging the automobile seat mould so that the side roll well is inclined in a direction parallel to its length, (b) introducing a liquid first foam formulation into the side roll well, (c) thereafter introducing a liquid second foam formulation within a time interval corresponding to between 0.01t to 1.5t, preferably 0.05t to 1.5t, most preferably 0.2t to 1.5t, where t is the cream time of the first foam formulation.

The present invention solves the problem defined above by introducing the formulations into a side roll well which is inclined in a direction parallel to its length. The foam formulations are preferably introduced at or near the top of the incline so that the side roll well is filled by the flow of the formulation down the incline. By using this arrangement and by introducing the second foam formulation onto the first foam formulation within the time interval defined good encapsulation can be obtained with little or no 'breakthrough' of the second foam.

It is preferred in the present invention that foam formulations are introduced into the side roll well at the same point located at or near the top of the incline. However, this is not a critical feature of the present invention and foam formulations can be introduced into the side roll well at any convenient point be it the same or different point as long as the hard foam formulation is introduced on the soft foam formulation. If desired, foam formulations can also be introduced into the side roll well stripwise along the length of the side roll well.

The process of the present invention is particularly applicable to typical automobile seat moulds which comprise a pair of side roll wells each well arranged either side of a central seating area. The process of the present invention may also be used to make backs for seats with harder side portions to provide side support by encapsulating harder foam into softer foam in the side support portions of backs for seats. In a preferred embodiment of the present invention the process described above is carried out in each side roll well in conjunction with the process of European Patent No. 68870 or U.S. Pat. No. 4,190,697 in the central seating area to produce for example a seat having encapsulated side rolls and a hard/soft foam layered seating area. In this preferred form, the first foam formulation produces soft foam and the second produces hard foam.

The hard and soft foam formulations are introduced into the side roll wells from one or more dispensing means. Preferably the dispensing means are mixing heads mounted upon a robot arm which can be controlled to dispense the formulations at a defined point above the mould. In the preferred embodiment the hard foam formulation is added during the time interval 0.01t to 1.5t, preferably 0.05t to 1.5t, most preferably 0.2t to 1.5t, where t is the cream time of the soft foam formulation. For soft foam formulations typically used in such applications (cream time 3 to 10 secs) the hard foam formulation can be added to the mould 0.6 to 15 secs after the soft foam formulation is introduced. The precise figure will clearly depend on the exact characteristics of the formulation and the degree of encapsulation, as measured by the thickness of the soft foam around the hard, required. A good rule-of-thumb is that the difference between the densities of the formulations when the hard foam formulation is added should not exceed 10% for good encapsulation.

The process of the present invention is preferably operated so that the side roll wells are inclined from between 0.1 to 40 degrees to the horizontal plane. This may be achieved by actually tilting the mould or by employing a mould which has been manufactured with an inclined side roll wells. In fact, for most conventional automobile seat moulds, the incline in the mould running from the front to the back of the seat is sufficient for the purposes of this invention. Preferably, the angle of incline is 4 to 20 degrees, most preferably 5 to 12 degrees.

Once the process of the present invention has been carried out and, in addition, any dosing of foam formulations into other parts of the mould, then the mould is closed and the contents are allowed to expand and cure. After curing the moulded article is demoulded in the usual way.

The foam formulations to be used in the present invention are suitably polyurethane foam formulations, although it is envisaged that the technique could be applicable to other polymer foam systems. Polyurethane foams are well known in the art and comprise the product obtained by mixing a polyfunctional isocyanate with a polyfunctional active hydrogen containing compound (e.g. a polyether polyol) in the presence of a blowing agent.

In the process of the present invention, such mixtures are generated in the mixing head and then poured into the mould through the outlet before the mixture has started to rise, i.e. whilst the foam formulation is still in an essentially liquid state.

The process of the present invention can be used with any type of polyurethane foam formulation including both 'hot-cure' and 'cold-cure' formulations. Preferably the formulations used are the 'cold-cure' type.

In general the polyfunctional active hydrogen containing compound can be any one of polyether polyols, polyester polyols, polycarbonates, polycaprolactones, poly THF, saturated polybultadienes and the like. Preferably the polyfunctional hydrogen containing compound is a polyether polyol in which the active hydrogens are those on primary and/or secondary hydroxyl groups. These compounds are generally known in the art as polyols; hot cure foams employing polyols having more secondary than primary hydroxyl groups and cold cure foams using polyols having more primary than secondary.

The preferred polyurethane foam formulations to be used in the present invention however are those producing flexible foam, most preferably flexible HR (high resilience) foams. In such a case, two streams are fed to the mixing head; one comprising a formulated polyol, i.e. some or all of polyols, polymer polyols, blowing agent, catalysts, silicone surfactants and other additives; the other comprising the polyisocyanate.

Examples of preferred polyols for HR foams are those polyols having the following additional characteristics:

(a) an average primary hydroxyl content of at least 40 mole percent (or no more than 60 mole percent of the less reactive secondary hydroxyl groups); and (b) an average molecular weight of from about 2000 to about 12000.

Preferably, such polyether polyols for use as components of HR foam formulations contain from about 60 to about 90 mole percent of primary hydroxyl groups and have an average molecular weight of from about 4000 to 7000.

Consistent with their polyfunctionality and the aforesaid respective ranges of molecular weights, such polyether polyols have hydroxyl numbers from 84 to 21, preferably from 42 to 24. These highly reactive polyether polyols are provided by oxyalkylation of a polyfunctional alcohol starter such as glycerol sorbitol and the like, with propylene oxide and ethylene oxide. Usually, the total ethylene oxide content of the polyether polyol is between about 7 and about 20 weight percent, expressed on the basis of total alkylene oxide feed during the oxyalkylation reaction. The high primary hydroxyl content is introduced by capping of the polyoxyalkylene chains with at least a portion of the total ethylene oxide feed.

For both cold cure and hot cure foams, the polyether polyols may be employed in combination with other polyols to control the degree of softness or hardness of the foam and to vary the load bearing properties.

In particular, the formulated polyol may contain polymer polyols which in turn contain finely dispersed or grafted organic or inorganic material to provide improved load bearing properties. Examples of such polymer polyols are graft polymer polyols prepared by polymerising ethylenically unsaturated monomers e.g. acrylonitrile and/or styrene in a polyether polyol or the so called PHD or PIPA dispersion polymer polyols. The polyether polyol in which the polymerisation takes place preferably has the characteristics indicated above in the case of polyols for HR foam.

Water or other conventional blowing agents can be used in the present invention.

The catalysts used are known per se, e.g. tertiary amines such as triethylamine, tributylamine, N-methylmorpholine, N-ethylmorpholine, N,N,N',N'-tetramethyl-ethylene-diamine, 1,4-diazabicyclo-(2,2,2)octane, N-methyl-N'-dimethyl-amino-ethylpiperazine, N,N-dimethyl benzylamine, bis-(N,N-diethylaminoethyl)adipate, N,N-diethylbenzylamine, pentamethyldiethylenetriamine, N,N-dimethylcyclo-hexylamine, N,N,N',N'-dimethyl-phenyl-ethylamine, 1,2-dimethylimidazole and 2-methyl-imidazole, triethylene diamine, bis(2-dimethylamino ethyl) ether.

Tertiary amines which contain hydrogen atoms capable of reacting with isocyanate groups may also be employed, e.g. triethanolamine, triisopropanolamine, N-methyldiethanolamine, N-ethyldiethanolamine, N,N-dimethylethanolamine or their reaction products with alkylene oxides such as propylene oxide and/or ethylene oxide.

Organic metal compounds may also be used as catalysts according to the invention, especially organic tin compounds. The organic tin compounds used are preferably tin (II) salts of carboxylic acids such as tin (II)-acetate, tin (II)-octoate, tin (II)-ethylhexonoate and tin (II)-laurate and the dialkyl tin salts of carboxylic acids such as dibutyl tin diacetate, dibutyl tin dilaurate, dibutyl tin maleate or dioctyl tin diacetate.

The catalysts are generally used in a quantity of between 0.002 and 10% by weight, based on the total quantity of polyol.

In producing flexible polyurethane foam in accordance with the method of this invention, a minor amount of an organosilicone surfactant may also be present as an additional component of the polyurethane-forming reaction mixture. When used, such surfactants are usually present in amounts up to about 5 parts by weight per 100 parts by weight of total polyol reactant. Suitable classes of silicone surfactants are poly(dimethylsiloxane) oils and the polysiloxanepolyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone to form a comb-like or branched structure. Usually, the polysiloxane blocks are trialkysiloxy end blocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are the hydrocarbyl groups having from 1 to 12 carbon atoms including alkyl, aryl, aralkyl, bicycloheptyl and halogen substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like.

The organosilicone component is preferably present in formulations in an amount between about 0.025 and about 2 parts by weight per 100 parts by weight of total polyol.

Generally, the blowing agent is employed in an amount from about 1 to about 15 parts by weight per 100 parts by weight of polyol, the particular blowing agent and amount thereof depending upon the type of foam product desired. Flexible foam formulations usually contain no more than about 6 pphp of water. The selection and amount of blowing agent in any particular foam formulation is well within the skill of those skilled in the polyurethane foam art. Suitable organic blowing agents are halogenated alkanes, such as methylene chloride, chloroform, ethylidene chloride, vinylidene chloride, monofluorotrichloromethane, chlorofluoromethane or dichlorodifluoromethane, carbon dioxide or other inert gases. A blowing effect can also be obtained by adding compounds which decompose at temperatures above room temperature to liberate gases, e.g. azo compounds such as azoisobutyric acid nitrile which liberate nitrogen.

Other ingredients may also be included optionally. They include chain extenders, crosslinkers, colouring agents, fillers, flame retardants and the like.

Chain extenders are difunctional compounds containing active hydrogen (i.e. hydrogen which will react with isocyanate groups under the conditions used in foaming). Examples of suitable compounds containing active hydrogen are compounds containing hydroxyl or amines groups. Cross-linkers are compounds containing more than 2 active hydrogen atoms per molecule, preferably more than 3. Examples of such cross-linkers are diethanolamine, triethanolamine, N,N,N',N'-tetrakis(2-hydroxypropyl) ethylene diamine, and phenol/formaldehyde/aniline condensation products.

The active hydrogen content of the cross-linker or chain extender is preferably relatively high so as to allow a significant effect on hardness to be obtained without requiring an excessive amount of additive. The active hydrogen content may for example correspond to a hydroxyl number as low as 50, particularly when a chain extender is used. The cross-linker or chain extender preferably has an active hydrogen content corresponding to a hydroxyl number of at least 100, more preferably 600 to 1500.

Where the cross linker or chain extender is fed as an additive to one of the main reaction streams it is preferably used at the rate of 2 to 10 parts by weight per 100 parts of polyol.

It is also sometimes desirable to include various additives in the reaction mixture such as colouring agents, fillers, flame retardants and the like. Suitable colouring agents are, for example carbon black, titanium dioxide, methyl blue, chromium red and the like. Suitable fillers are vermiculite, saw dust, synthetic plastics including vinyl polymers such as, polyvinyl chloride, polystyrene and the like. Suitable flame retardants are antimony oxide, tris (chloroethyl) phosphate, tricresyl phosphate, triphenyl phosphate, melamine and the like.

The isocyanate component employed in this invention for mixing with active hydrogen compounds are those compounds having the general formula:

$$Q(NCO)_i$$

wherein i is an integer of two or more and Q is an organic radical having the valence of i. Q can be a substituted or unsubstituted hydrocarbon group (e.g. an alkylene or an arylene group). Examples of such compounds include hexamethylene diisocyanates, phenylene diisocyanates and tolyene diisocyanates.

Q can also represent a polyurethane radical having a valence or i in which case $Q(NCO)_i$ is a composition conventionally known as a pre-polymer. Such pre-polymers are formed by reacting a stoichiometric excess of a polyisocyanate with an active hydrogen-containing component, especially polyhydroxyl containing materials or polyols.

More specifically, the polyisocyanate component employed in this invention also includes the following specific compounds as well as a mixture of two or more of them, 2,4-tolylene diisocyanate, 2,6-tolylene diisocyanate, crude tolylene diisocyanate, bis(4-isocyanatophenyl) methane, and polyphenylmethylene polyisocyanates that are produced by phosgenation of aniline formaldehyde condensation products.

The polyurethane foam formulations used in the process of the present invention are preferably chosen such that they differ in hardness from each other. It is further preferred that such formulations differ in hardness by virtue of their content of one or more of the following:
1. polymer polyols,
2. isocyanate with a functionality of two or greater than two, or isocyanate index,
3. active hydrogen containing compound which may be chain extender or cross-linker,
4. blowing agent.

BRIEF DESCRIPTION OF THE DRAWINGS

The invention defined above will now be illustrated with reference to the following Examples which make reference to the accompanying drawings in which.

EXAMPLE 1

Figure 1:
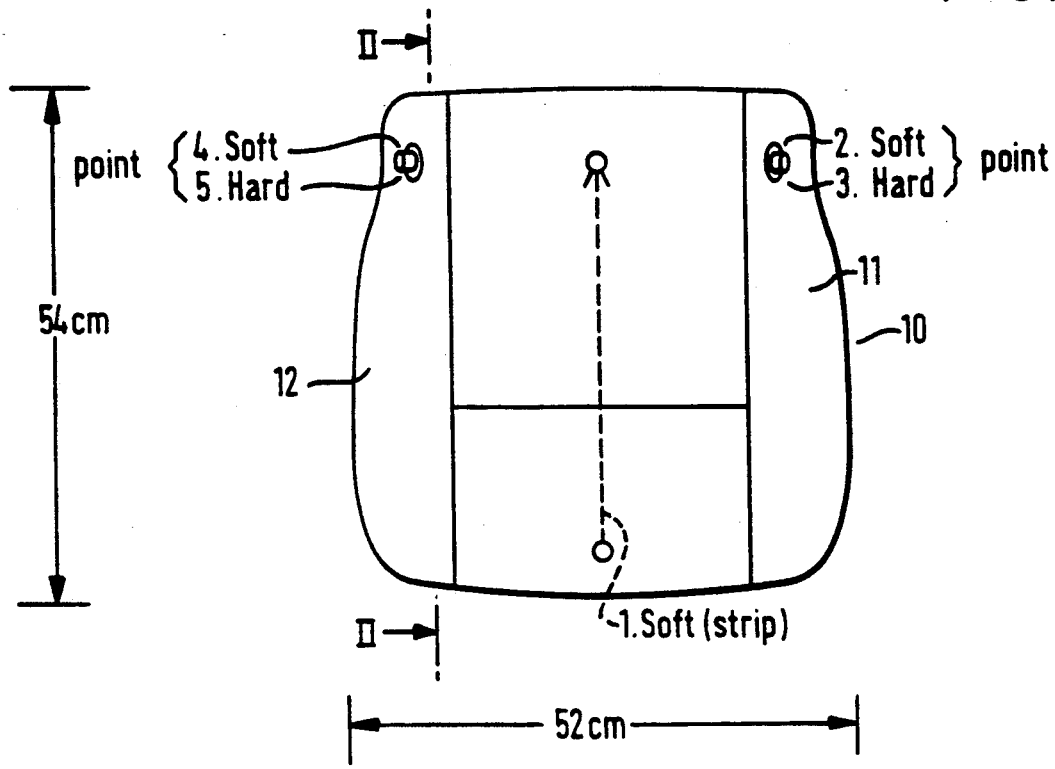
FIG. 1 is a plan view of a mould for an automobile seat cushion.
Figure 2:
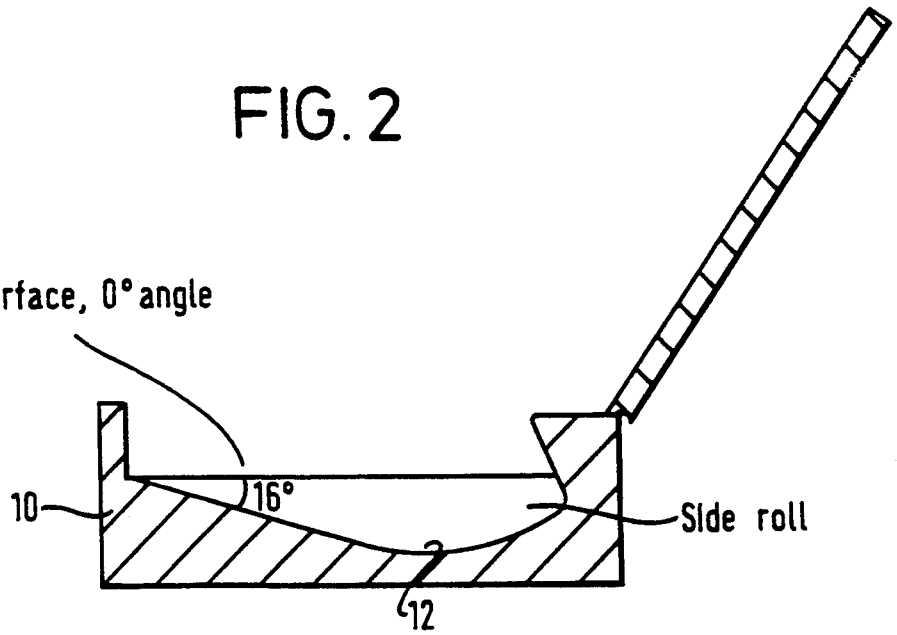
FIG. 2 is a longitudinal section through the mould of FIG. 1 on the line II—II.

An automotive front seat cushion mould 10 was used, as schematically depicted in FIGS. 1 and 2. The inclination of the side roll wells 11, 12 was 16°, the mould surface angle was 0°. The width of the seat mould is approximately 52 cm and the maximum width of each side roll well is approximately 18 cm.

Two outlets fixed on an Asea 90 Robot arm, separated by a distance of 12 cm were used. The outlets were fed by a Krauss Maffei RIM star 40/20 machine equipped with AMK 1612-UL2K mixing head for the soft and by a Krauss Maffei KK 10-5/5 machine equipped with AMK 128-UL2K mixing head for the hard foam formulation.

The foam formulations are given on tables 1 and 2. First the soft foam formulation (pouring time: 1.8 sec) was poured into the central part of the mpuld stripwise from the bottom of the mould upwards (see FIG. 1). Immediately afterwards (pouring time: 0.4 sec) of the same soft foam formulation was poured onto an upper point of the right side roll well; one second later the hard foam formulation (pouring time: 0.9 sec) was poured onto the same point of the right side roll. Thereafter the soft foam formulation (pouring time: 0.4 sec) was poured onto an upper point of the left side roll well and one second later the hard foam formulation (0.9 sec.) onto the same point. The mould was closed and the foams rose in the mould and was demoulded after 5 minutes.

The cushion was crossectioned, so as to measure the degree of encapsulation of the hard foam in the side rolls. The soft foam thickness surrounding the hard foam in the side roll was 2 cm.

EXAMPLE 2

Example 1 was repeated except that the hard foam formulation was added to each side roll well 5 seconds after the soft foam formulation had been added. On analysing the final cushion it was found that a 0.5 cm thickness of soft foam surrounded the hard. This shows that the thickness of the encapsulating foam can be varied by varying the time at which the hard foam formulation is introduced into the side roll wells.

TABLE 1

| SOFT FOAM FORMULATION | |
|---|---|
| Polyol Stream | Parts By Weight |
| U1315 Polyol (ex BPCI) | 100 |
| Water | 3 |
| Niax A1 Catalyst (ex UCC) | 0.1 |
| Dabco 33 LV Catalyst (ex APCI) | 0.6 |
| Y 10366 Silicone Surfactant (ex UCC) | 0.7 |
| Isocyanate Stream I 1317 (ex BPCI), Index 100, 80/20 TDI/MDI | |
| Cream Time = 5 secs Polyol Stream Output = 225 g sec$^{-1}$ Isocyanate Output = 83 g sec$^{-1}$ Total Output = 308 g sec$^{-1}$ Ratio (Polyol/Isocyanate) = 2.7 | |

BPCI = B. P. Chemicals International
APCI = Air Products and Chemicals Inc.
UCC = Union Carbide Corporation

TABLE 2

| HARD FOAM FORMULATION | |
|---|---|
| Polyol Stream | Parts by Weight |
| RP 1490 Polymer Polyol (ex BPCI) 35% Solids | 100 |
| Water | 2.8 |
| Niax 1 Catalyst (ex UCC) | 0.1 |
| Dabco 33 LV Catalyst (ex APCI) | 0.7 |
| Y 10366 Silicone Surfactant (ex UCC) | 2.4 |
| Isocyanate Stream I 1317 (ex BPCI), Index 100, 80/20 TDI/MDI | |
| Cream Time = 3 secs Polyol Stream Output = 120 g sec$^{-1}$ Isocyanate Stream Output = 40 g sec$^{-1}$ Total Output = 160 g sec$^{-1}$ Ratio (Polyol/Isocyanate) = 3.04 | |

UCC = Union Carbide Corporation
APCI = Air Products and Chemicals Inc.
BPCI = B. P. Chemicals International

EXAMPLE 3

An automotive front seat cushion mould was used, as schematically depicted in FIGS. 1 and 2. The inclination of the side roll wells was 16°, the mould surface angel was 0°.

Two outlets fixed on an Asea 90 Robot arm, separated by a distance of 12 cm were used. The outlets were fed by a Krauss Maffei RIM star 40/20 machine equipped with AMK 1612-UL2K mixing head for the soft and by a Krauss Maffei KK 10-5/5 machine equipped with AMK 128-UL2K mixing head for the hard foam formulation.

The foam formulations are given in Table 3. First the soft foam formulation (180 g) was poured into one of the side roll wells and 0.6 second later the hard foam formulation (110 g) was poured as a point pour near the center of that side roll well. This operation was then repeated in the second side roll well and afterwards the soft foam (730 g) was poured stripwise down the central part of the mould from front-to-back in order to completely fill the mould with the foam. The mould was then closed and the foam allowed to rise in the mould and cure for about 5 minutes before being demoulded.

The seat cushion was cross sectioned, so as to measure the degree of encapsulation of the hard foam in the side rolls. The soft foam thickness surrounding the hard foam in the side roll was 1.8 cm.

EXAMPLE 4

Example 3 was repeated except that the hard foam formulation was added to each side roll well 1.5 second after the soft foam formulation had been added. On analysing the seat cushion obtained it was found that a 1.4 cm thickness of soft foam surrounded the hard foam.

EXAMPLE 5

Example 3 was repeated except that the foam formulations were added stripwise along the length of each side roll well and that the hard foam formulation was added to each side roll well 2.0 seconds after the soft foam formulation had been added. On analysing the seat cushion obtained it was found that a 1.0 cm thickness of soft foam surrounded the hard foam.

EXAMPLE 6

Example 3 was repeated except that the hard foam formulation was added to each side roll well 3.0 seconds after the soft foam formulation had been added. On analysing the seat cushion obtained it was found that a 0.7 cm thickness of soft foam surrounded the hard foam.

EXAMPLE 7

Example 3 was repeated except that the hard foam formulation was added to each side roll well 4 seconds after the soft foam formulation had been added. On analysing the seat cushion obtained it was found that a 0.4 cm thickness of soft foam surrounded the hard foam.

TABLE 3

| | Soft Foam Formulation (parts by weight) | Hard Foam Formulation (parts by weight) |
|---|---|---|
| Polyol Stream | | |
| VORANOL* CP 6001 | 70 | 20 |
| SPECFLEX* NC 603 | 20 | 80 |
| POLYURAX* U2421 | 10 | — |
| ARCOL TM 1180 (Arco Chemicals) | 2.0 | — |
| Water | 3.4 | 3.4 |
| CATALYST blend of DABCO 33LV NIAX 171 Polycat 77 | 0.8 | 0.6 |
| Diethanolamine (88%) | 0.5 | |
| Glycerol | 0.5 | 0.5 |
| TEGOSTAB TM (Goldschmidt) | 0.1 | 0.1 |
| Isocyanate Stream | | |
| URECOR* 2000/6900 | Index 80 | Index 100 |
| Reactivity | | |
| Cream Time(s) | 7 | 8 |
| Gel Time(s) | 44 | 44 |
| Rise Time(s) | 65 | 58 |

*Trademark of The Dow Chemical Company

Many modifications and variations of the techniques described above are within the scope of the invention.

The side roll of a seat is that part of the seat cushion or back rest which is at the side of the occupant and which is intended to provide the occupant with lateral support. In the case of a bench seat for two or more occupants side rolls may be provided not only at the sides of the seat but also in the middle or more generally at one or more positions intermediate the sides of the seat, which position or positions will be at the side of an occupant of the seat in use.

Typically the side roll well of a mould will be a cavity having a width not greater than 30 cm, e.g. 10 to 20 cm. Such a side roll well will usually be bordered by mould side wall portions on each side of said well over a depth of at least 5 cm, more typically at least 10 cm, e.g. up to 30 cm. Typically the base of such a well will be concave toward the well interior when viewed in section transverse to the length of the well.

We claim:

1. A process for preparing a multihardness foamed seat having side rolls comprising one or more zones of a second polyurethane foam encapsulated in a first polyurethane foam by foaming and curing a first polyurethane foam formulation and a second polyurethane foam formulation in a side roll well of a seat mould which comprises the steps of:
   (a) arranging the seat mould so that the side roll well is inclined in a direction parallel to its length,
   (b) introducing a liquid first foam formulation into the side roll well,
   (c) thereafter introducing a liquid second foam formulation onto the liquid first foam formulation commencing within a time interval after the end of the addition of the liquid first foam formulation corresponding to between 0.01t to 1.0t where t is the cream time of the liquid first foam formulation, the second foam formulation becoming encapsulated by the first foam formulation such that upon foaming and curing of the first and second formulations, the multihardness foamed seat having side rolls comprising one or more zones of the second formulation encapsulated in the first formulation is produced.

2. The process of claim 1 wherein in step (c) the liquid second foam formulation is introduced within a time interval corresponding to between 0.05t to 1.0t where t is the cream time of the first foam formulation.

3. The process of claim 1 wherein in step (c) the liquid second foam formulation is introduced within a time interval corresponding to between 0.2t to 1.0t where t is the cream time of the first foam formulation.

4. The process of any one of claims 1 to 3 wherein said liquid first foam formulation and said liquid second foam formulation give foams of different hardness.

5. The process of claim 4 wherein said liquid first foam formulation gives soft foam and said liquid second foam formulation gives hard foam.

6. The process of any one of claims 1 to 5 wherein said liquid first foam formulation and said liquid second foam formulation are introduced into the side roll well at the same point located at or near the top of the incline of the side roll well.

7. The process of any one of claims 1 to 5 wherein said liquid second foam formulation is introduced into the side roll well at a point different from that where said liquid first foam formulation was introduced.

8. The process of any one of claims 1 to 5 wherein said liquid first foam formulation and said liquid second foam formulation are introduced into the side roll well stripwise.

9. The process of any one of claims 1 to 8 wherein the side roll well is inclined between 0.1 to 40 degrees to the horizontal plane.

10. The process of any one of claims 1 to 9 wherein said liquid first foam formulation has a cream time of 3 to 10 seconds.

* * * * *